Aug. 2, 1960 E. BLOCH 2,947,977

SWITCH CORE MATRIX

Filed June 11, 1956 3 Sheets-Sheet 1

INVENTOR.
ERICH BLOCH
BY William V. Schelberg
AGENT

Aug. 2, 1960 E. BLOCH 2,947,977

SWITCH CORE MATRIX

Filed June 11, 1956 3 Sheets-Sheet 2

Aug. 2, 1960 E. BLOCH 2,947,977

SWITCH CORE MATRIX

Filed June 11, 1956 3 Sheets-Sheet 3

United States Patent Office 2,947,977

Patented Aug. 2, 1960

2,947,977

SWITCH CORE MATRIX

Erich Bloch, Poughkeepsie, N.Y., assignor to International Business Machines Corporation, New York, N.Y., a corporation of New York Filed June 11, 1956, Ser. No. 590,701

8 Claims. (Cl. 340—174)

This invention relates to magnetic core memory systems and is directed in particular to improved magnetic switch apparatus for providing operating currents therefor.

In arrays of magnetic cores employed for storage of binary information as represented by relative stable remanence states attained by individual cores, it is convenient to consider them arranged in ordered geometric form for operation in accordance with the well known coincident current technique. With such systems, a coincidence of two input signals is generally required to provide a magnetomotive force of sufficient magnitude to overcome the coercive force of any one core and for this purpose the memory array is arranged in rows and columns formed of cores linked by individual windings. By applying a current pulse of proper polarity to one column winding and a coincident pulse to one row winding, each pulse providing a force less than the coercive force, only that core linked by both windings changes remanence state to register the information represented by the pair of pulses. Such an operation as described may be employed in storing the desired information at a particular row and column address and may be extended to include a number of planes of cores with a like core in each plane corresponding to bits of a binary word or character having that address. In three dimensional systems, those cores in which an absence of information is to be registered, an inhibit winding individual to the particular bit plane is pulsed to counteract the effects of one of the selecting pulses applied to the row and column coordinate windings. In interrogating the core or cores to determine the magnetic state retained, the two linking row and column windings may be pulsed again in coincidence but in an opposite sense with interrogation or read pulsing returning the cores to an initial remanence state if in an information representing state. This flux change causes a voltage to be induced in a sense winding linking the individual bit core due to collapse of the magnetic field in one direction and its build up in the opposite direction. Such interrogation provides an output pulse indicative of the particular residual state attained by the bit core, but at the same time, the information is destroyed. If the information is to be repeatedly read out it must be restored after each reading and for this purpose every read cycle is commonly followed by a write cycle to return the core to the state held before reading. When the memory organ is to be cleared of information, the write cycle is disabled or the inhibit winding pulsed simultaneously with X and Y coordinate windings so that the cores are reset to a datum state.

The pulse generators for driving an array of any appreciable size must be capable of delivering power in proportion to the number of cores linked by the row and column windings of one or more planes and must also be capable of bidirectional operation unless sets of oppositely wound row and column windings are provided.

It has been proposed heretofore that such pulse generators be formed of magnetic cores that are switched from one remanence state to the other to provide bidirectional output pulses on secondary windings connected to the memory array windings and further, that such driver cores be arranged in the form of a coordinate matrix. The selection of a particular driver core to produce a bidirectional signal for the memory involves using coincident current technique like that in the memory itself and has been found to cause spurious drive signals to be delivered to windings other than that selected due to half select signals developed in other switch cores and disturbances caused by mutual inductance between the windings of the switch core array.

In accordance with the present invention a switch core matrix is provided in which certain of the selection lines are biased prior to delivery of signals for operating a selected core whereby the effects of mutual inductance between windings is minimized and greater flux changes are permitted in the core selected for activation.

A broad objective of the invention is to provide an improved switch core matrix system for operating a memory array.

A more specific object of the invention is to provide the mode of operation of an anti-coincident switch matrix system by a technique of preinhibition of selected coordinate windings.

A further object of the invention is to provide a mode of operation of an anti-coincident switch matrix whereby the read cycle in a random access core memory may be initiated prior to receipt of the interrogation address.

Another object of the invention is to provide an improved magnetic switch matrix that avoids spurious outputs.

Still another object of the invention is to provide a mode of operation of an anti-coincident matrix switch system wherein the inhibit bias on non-selected ones of the switch cores in one coordinate dimension is applied in two increments.

Another object of the invention is to provide an arrangement of the memory matrix selection windings wherein improved operation is obtained in conjunction with use of an anti-coincident switch matrix.

Other objects of the invention will be pointed out in the following description and claims and illustrated in the accompanying drawings, which disclose, by way of example, the principle of the invention and the best mode, which has been contemplated, of applying that principle.

The storage of binary information through establishing representative states of magentization in bistable ferromagnetic devices is well known. Magnetic cores formed of either metallic or ferrite materials may have a somewhat rectangular hysteresis characteristic and are employed for memory applications where they are driven to one or the other of their stable residual states by energizing windings which embrace the magnetic circuit of the core and apply a magnetomotive force thereto of desired magnitude and direction.

One of the stable states may be chosen to represent binary one and the other state then represents binary zero, with energization of the windings causing an output voltage to be induced in a winding linking the core for indicating that a change from one state to the other has occurred.

Figure 1:
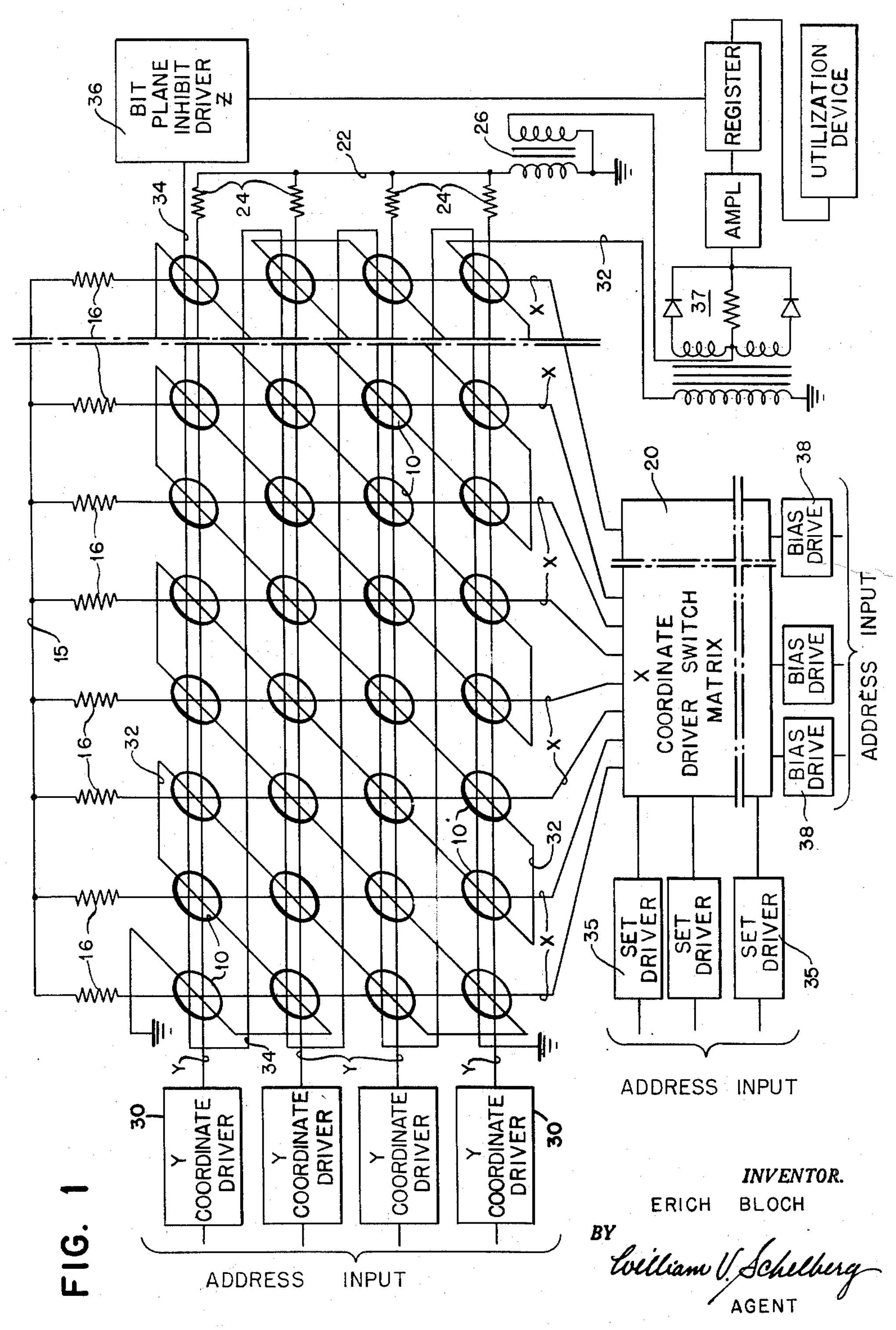
Figure 1 is a schematic representation of one plane of a three dimensional array of magnetic cores employed as a memory component, showing the arrangement of windings and the current drivers therefor.

A two dimensional core array is shown in Figure 1 with saturable cores 10 shown as toroids and positioned in rows and columns. Each column of cores 10 is linked by a winding X having one turn and each row is linked by a winding Y also shown as having a single turn, however multiple turn windings may obviously be employed. The X and Y coordinate windings are energized selectively through pulse driver systems that are generally operated from address selection means, not shown, that may be in the form of a crystal diode matrix or other device which reduces the number of input switches required.

One terminal of each of the matrix column windings X is connected to a bus 15 through individual resistors 16 and the remaining terminals are connected to a driver switch matrix 20.

The bus 15 is left floating rather than being grounded as in conventional arrangements with the current return path for the selected line thus distributed through the remaining unenergized lines in substantially equal proportions. These increments of returning current provide a cancelling effect on the unselected lines in bucking out certain undesired current pulses developed in them from operation of the matrix switch 20 as will be described hereafter.

One terminal of each of the matrix row windings Y is connected to a bus 22 through individual resistors 24 with the bus 22 coupled to ground through the primary winding of a cancelling transformer 26 of the type shown and described in copending application, Serial Number 443,284, filed July 14, 1954 on behalf of E. W. Bauer et al. The other terminals of the Y windings are connected to individual switch core drivers 30. A sense winding 32 is shown linking each of the cores 10 and is wound in zig zag fashion through the memory array plane to cancel out some of the effects contributed by those cores that are partially excited on interrogation. An inhibit winding 34 is provided linking each of the cores of the single bit plane shown in a like sense and is driven by a switch core driver unit 36. Like the sense winding 32, this inhibit winding is individual to the single plane whereas the X and Y coordinate windings may be common to a plurality of bit planes.

The memory array may advantageously be operated in accordance with a staggered read method as described in detail in the copending application, Serial Number 442,013, filed July 4, 1954 on behalf of M. K. Haynes, wherein the X coordinate currents are turned on one microsecond ahead of the Y currents so that the half select noise due to the X lines will occur before sensing time and can be gated out. The bi-polar sense winding configuration alternates its direction as it passes through each core, and since the signal is the algebraic sum of all the core outputs, most of the half-selected core signals are cancelled out provided they are magnetically equivalent and have the same remanence history. The output signal is rectified by the full wave rectifier and transformer arrangement designated generally as 37 and the output from the secondary of the cancelling transformer 26 is introduced with the rectified signal. The Y line currents are returned to ground through the primary of the cancel core transformer 26 to oppose the sense winding signal and is effective to cancel a zero output signal with little or no change in a one signal due to the time differential of these outputs.

To provide read and write impulses to the coordinate windings X and Y, the drivers 20 and 30 must be capable of bidirectional operation while the inhibit driver 36 need only be capable of unidirectional operation since it selectively functions to oppose only a write impulse on the coordinate windings.

The array illustrated is non-symmetrical in form and such an arrangement sets forth the utility in employing coordinate drivers of different type. The drivers 30 are individually operated in accordance with the address signal input delivered to them from an address register, not shown, while the driver 20 is a further coordinate array of magnetic cores capable of delivering pulses to a plurality of output lines while using a minimum number of drivers. This latter switch array is operated by further coordinate drivers 35 and 38 which, in turn, are controlled by address signal sources not shown.

Figure 2:
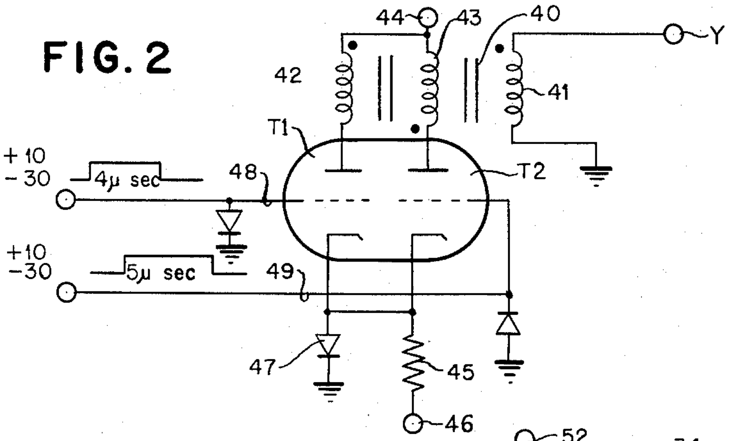
Figure 2 is an illustration of a bidirectional switch core driver unit of the type employed for one of the memory matrix selection coordinates.

Referring now to Figure 2, a bidirectional switch driver is shown of the type indicated by 30 in Figure 1. A switch core 40, which may be a tape core consisting of fine laminations of 4–79 Mo-Permalloy, is provided with an output winding 41 and a pair of input windings 42 and 43. The winding 41 is grounded at one terminal with the other terminal coupled to one of the Y selection lines of the memory array. The windings 42 and 43 have one end connected to a source of positive potential at a terminal 44 with the remaining winding terminals connected to the plate of triodes $T_1$ and $T_2$, respectively. The cathodes of the tubes $T_1$ and $T_2$ are connected through a resistor 45 to the negative terminal 46 of the potential source. A diode 47 is coupled between the cathodes and ground in order to allow cut off at −30 volts potential as the circuit is essentially a cathode follower arrangement and the cathode would otherwise follow the grid. With the diode provided, each tube T functions as a constant current generator turned on at +10 and off at −30 volts as signals are applied to the grid circuits 48 and 49 provided for the tubes $T_1$ and $T_2$. The windings 42 and 43 are oppositely poled as indicated by the dot marking adjacent one end. As soon as a positive going signal is applied to the grid 48, tube $T_1$ conducts through the winding 42 and the core 40 switches inducing a voltage in the secondary winding 41 that sends current through the coordinate winding Y. When $T_1$ is turned off, the core remains in the set position of remanence and thereafter a pulse is applied to the grid circuit 49 causing the tube $T_2$ to conduct and switch the core back to a reset remanence position thus inducing a current pulse in the secondary opposite to the previously obtained direction. The pulse due to conduction of tube $T_1$ is the read pulse and that due to conduction of tube $T_2$ is the write pulse.

The duration and magnitude of these current pulses must be equal to the switching time of a memory core and less than the threshold with the resistors 24 selected of such a magnitude that the combined impedance of the memory cores on the selection line winding and the impedance of the tube circuit is negligible as compared with it.

Figure 3:
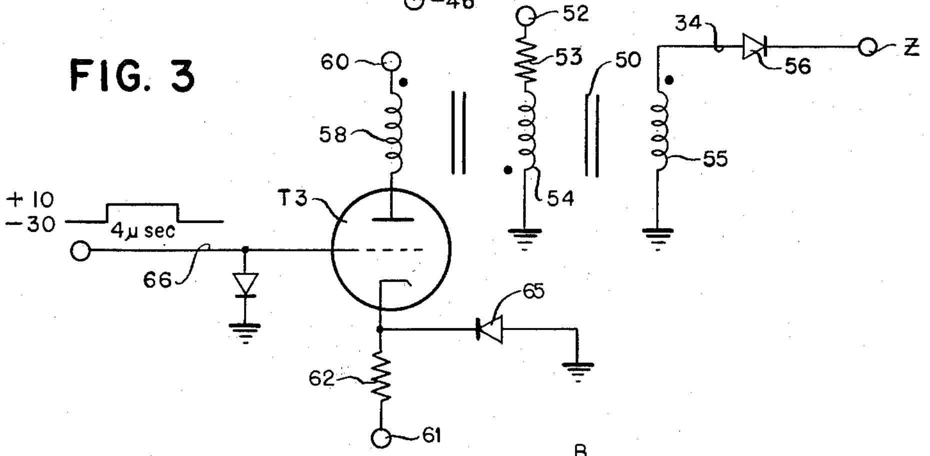
Figure 3 is a schematic illustration of a undirectional switch core driver of the type employed for the inhibit or Z plane coordinate of the memory array.

A switch driver of the type employed for pulsing the inhibit winding of a bit plane as indicated by element 36 in Figure 1 is shown schematically in Figure 3. This driver need deliver only unipolar current and employs a core 50 normally biased close to the reset saturation point by a direct current source. Like the core 40, this core may also be a tape wound metallic core of Mo-Permalloy material. Terminal 52 designates the positive terminal of such a bias source as mentioned and is coupled through a resistor 53 to a winding 54, poled to provide a magnetomotive force in the reset direction as indicated by the dot marking adjacent the grounded end. An output secondary winding 55 has one end grounded with the other end coupled to the Z plane winding 34 through a diode 56. Core 50 is also provided with an input winding 58 coupled at one end to a positive terminal 60 and at the other end to a negative terminal 61 through the plate-cathode circuit of a tube $T_3$ and a resistor 62. As in the tube arrangement of Figure 2, the cathode electrode of tube $T_3$ is coupled to ground through a diode 65 to allow cut off at −30 volts grid potential. The grid circuit 66 then is subjected to a pulse swing from −30 to +10 volts to cause operation of the tube $T_3$ at the desired time, coincident with the pulse on the grid circuit of tube $T_2$ in Figure 2, when a zero is to be stored in the array. When the tube $T_3$ grid current is turned off, the bias is effective on the winding 54 to return the core to the reset saturation point with output current flow blocked by the diode 56.

Figure 4:
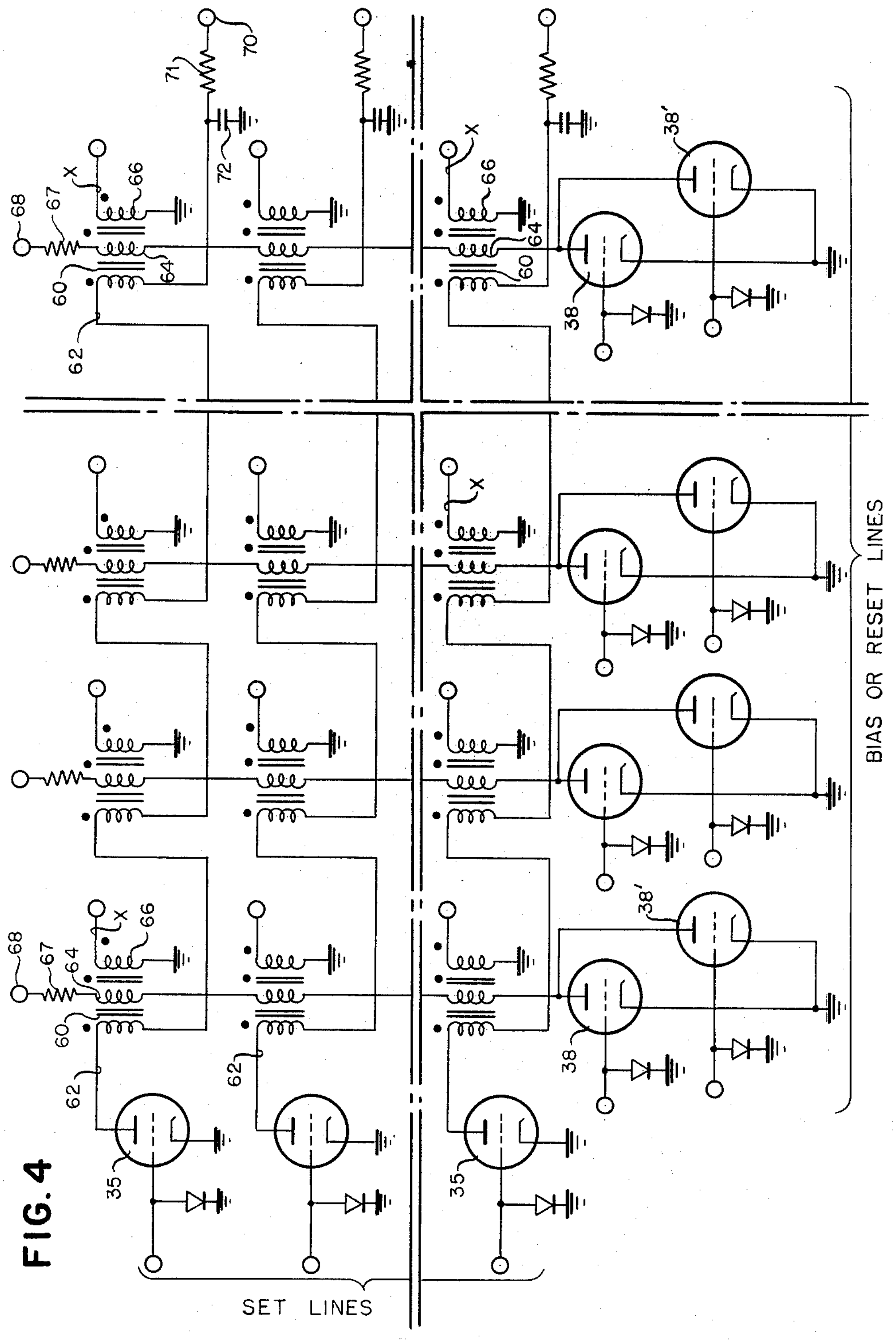
Figure 4 is a representation of a bidirectional switch core driver array.

The matrix switch driver 20, as illustrated in Figure 1, is provided with coordinate drivers 35 and 38 termed set and bias drivers respectively. These drivers may be of the type described in connection with Figure 3 or direct tube drivers as illustrated in Figure 4. The advantage in employing a matrix switch device resides in reducing the number of individual driver units in that 2N drivers may control the selection and pulsing of $N^2$ coordinate lines of the memory array. As shown in Figure 4, switch cores 60 are arranged in coordinate rows and columns with a set winding 62 common to the cores in each individual row and a bias winding 64 common to the cores in individual columns. Each core is provided with an individual secondary winding 66 coupled to a particular one of the X selection lines of the memory array. The windings 64 are series connected with one end coupled through a resistor 67 to a terminal 68 of a positive source of voltage with the other end of the series connected windings connected to ground through a pair of tubes designated 38 and 38'. The set windings 62 are likewise series connected and coupled at one end to a terminal 70 of a positive source of voltage not shown through a resistor 71 and shunt capacitor 72. The opposite end of the windings 62 is coupled to ground through the cathode of the driver tube 35.

Figure 5:
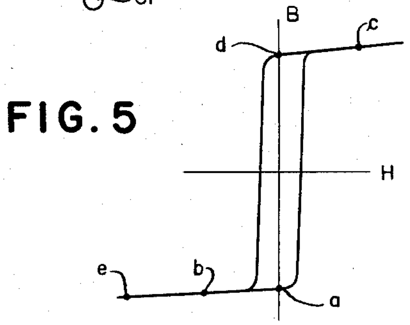
Figure 5 is a graphical illustration of the hysteresis characteristic of a magnetic core of the type employed in the driver switch array as used in explaining the operation of the system.

The $N^2$ switch cores 60 in the array are in a negative or reset state initially and all but one of the driver tubes 38 are rendered conductive to provide a negative bias in the reset direction. This condition of the switch cores may be visualized more clearly from a consideration of the hysteresis loop shown in Figure 5 where the reset state is indicated as point *a* and the biased state as point *b* on the curve. One column of cores then are established at negative remanence and the remaining cores in the array are at the biased state *b*. The particular column that is not biased is determined by the address, as is the particular set line that is pulsed by operation of one of the tubes 35. As the selected tube 35 is operated and one set line 62 driven towards positive saturation, only the one core in the unbiased column is caused to shift flux direction from point *a* toward point *c* and this core generates a current in its secondary winding 66 to provide a half-select read pulse for the selected X coordinate line of the memory array. This one core 60 then assumes a positive remanence condition indicated at point *d* on the loop. During the subsequent write cycle, the tube 38 connected to the particular column winding 64 of the switch array is turned on with only the core at point *d* on the hysteresis curve switched back to point *b* with a large flux change taking place to induce the half select write current in the appropriate X line.

Figure 6A:
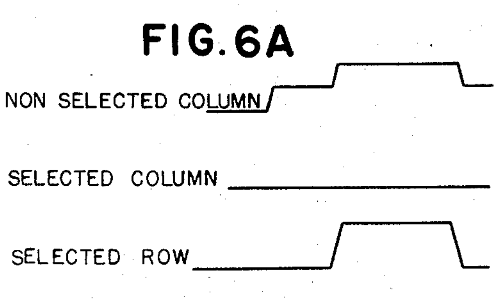
Figures 6A and 6B are charts illustrating the scheduling of set and reset pulses that are applied to the switch core array coordinate windings according to one feature of the invention.
Figure 6B:
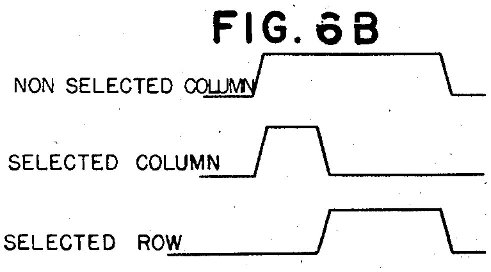

Bipolar current pulses are delivered from the selected switch core 60, however, certain other cores in the switch array are partially excited and develop output signals that must be minimized. As the bias current is turned on for all but the selected column of cores, a current is induced in the secondary windings of all the cores in traversing their loops from point *a* to point *b*. This spurious signal may be reduced to a practical value by keeping the rise time of the bias pulse as slow as possible. Cores located on the several biased column lines 64 and also on the pulsed set line 62 also produce secondary currents, however, the set pulse from a driver tube 38 may not be slowed down too much since the current output of the selected core must have an optimum rise time. These cores are driven to point *b* on the hysteresis loop by the bias current and subsequently traverse the loop to point *a*. In accordance with one feature of the invention these unwanted output signals are minimized by use of a double bias method which requires use of the two tubes 38 and 38' to drive the bias or reset lines of the matrix switch in two increments. The tubes 38 are turned on first to deliver bias current to the non-selected column windings with slow rise time, biasing these cores to point *b*, and the second set of tubes 38' for the non-selected lines are rendered conductive at the time the set current is turned on and providing additional bias current of comparable magnitude to the set current so that these cores remain at point *b* and no flux change occurs. The cores not on the driven set line 62 are driven closer to saturation or to point *e* on the curve of Figure 5, however, since the loop is sufficiently flat at this point, only a very small output is evident. This pulse sequence may be more clearly understood from the chart shown in Figure 6 (A). As mentioned heretofore, the output current produced by those cores that are located on the several biased column lines and also on the set line that is energized may be cancelled out in the memory array itself rather than minimized in the switch array by use of the tubes 38'. In accordance with this feature of the invention the bus 15 (Figure 1) is left floating so that the full output current developed by the selected switch core 60 must return through the remaining X lines. Each of these lines then carries $$\frac{1}{N-1}$$

fractional part of the selected X line current in a direction opposed to the current developed in those unselected X lines when their cores 60 shift from point *b* to point *a* so as to cancel this undesired current from the switch array.

The effects of mutual inductance between the bias lines 64 cause other unwanted signal difficulty in that small currents are induced in the unselected line 64 at bias time. This unwanted signal may be minimized according to another feature of the invention by a pre bias mode of operation. For this operation, all the tubes 38 are rendered conductive initially at bias time and, at the time the set line driver 35 is activated, the pre bias on the selected vertical winding is turned off allowing the selected core to be switched to the set position. This sequence of pulse application may be more clearly understood from the chart in Figure 6 (B). This latter mode of operation allows the read-write cycle of operation of the switch core driver array to begin prior to the time that the address information is made available by the computer and, in addition to reducing noise signals, reduces the memory operating cycle time.

To further reduce unwanted effects developed in the switch matrix array such as reflections and the like, the plate circuit of the set lines 62 are terminated by an impedance comprising the resistor 71 and capacitor 72 which reduces the transmission line effects of the circuit. Without such terminating impedance the primary current wave shape would vary.

It will be seen from the above description that novel switch core driver circuits are provided including a matrix switch that functions as a decoder and at the same time as a current step up device wherein unwanted output signals are limited by the techniques set forth.

While there have been shown and described and pointed out the fudamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. In a switch core driver matrix, an array of saturable magnetic cores capable of assuming bistable states of magnetic remanence arranged in coordinate rows and columns linked by individual row and column selection windings, means for energizing all but a selected one of said column windings with a current sufficient to bias the cores linked thereby toward saturation in one direction, means for energizing a selected one of said row windings with a current sufficient to drive the unbiased core linked thereby toward saturation in the other direction, and further means for applying an additional bias pulse to the windings of said non-selected columns simultaneously with the energization of said selected one of said row windings.

2. In a switch core driver matrix, an array of bistable magnetic cores arranged in coordinate rows and columns by individual row and column selection windings, output windings arranged on said cores and adapted to selectively develop drive pulses of opposite polarity for control of a memory core array, means for energizing all but one of said column selection windings with a current pulse sufficient to bias the cores linked thereby toward saturation in one direction, means for energizing a selected one of said row windings with a current pulse sufficient to drive the unbiased core linked thereby toward saturation in the opposite direction, and further means for applying an additional bias pulse to the windings of said non-selected columns simultaneously with the energization of said selected row winding, said additional bias pulse and said current pulse applied to said row winding being of substantially equal magnitude.

3. In a switch core driver matrix operative to provide read and write current pulses for a memory array, a matrix of saturable magnetic cores capable of assuming bistable states of magnetic remanence arranged in coordinate rows and columns linked by individual row and column selection windings, first means for energizing said column windings with a current sufficient to bias the cores linked thereby toward saturation in one direction, second means for energizing said column windings with an additional current sufficient to bias the cores linked thereby further toward saturation in said one direction, means for energizing a selected one of said row windings with a current sufficient to drive a subsequently unbiased core toward saturation in the other direction, said first means being initially operative with respect to all said column windings at the beginning of a read cycle, operation of said first means being maintained for the non-selected columns and terminated for the selected column with the second means for the non-selected columns being rendered operative when said means for energizing a selected one of said row windings is operated.

4. In a magnetic memory system comprising an array of saturable magnetic cores capable of assuming bistable states of magnetic remanence arranged in coordinate rows and columns linked by row and column coordinate selection windings individual thereto, means for energizing said coordinate windings including a magnetic switch matrix coupled to the selection windings along one of said coordinates, said switch matrix comprising an array of switch cores likewise arranged in coordinate rows and columns linked by individual set and bias windings respectively, each of said switch cores having a secondary winding linked to an individual one of said selection windings at one terminal thereof with the remaining terminals of said selection windings commonly connected through individual resistors and electrically floating, means for energizing non-selected ones of said switch matrix bias windings, means for energizing a selected one of the set windings of said switch matrix whereupon the switch core located on said energized set winding is caused to traverse its hysteresis loop and develop a drive pulse in a particular selection winding of the memory array.

5. In a magnetic memory system comprising an array of saturable magnetic cores capable of assuming bistable states of magnetic remanence arranged in coordinate rows and columns linked by row and column coordinate selection windings individual thereto, means for energizing said coordinate windings including a magnetic matrix switch coupled to the selection winding along one of said coordinates, said switch matrix comprising an array of switch cores likewise arranged in coordinate rows and columns linked by individual set and bias windings respectively, each said switch core having a secondary winding linked to one terminal of an individual one of said selection windings of the memory array with the remaining terminals of said selection windings commonly connected through individual impedance elements and electrically floating, means for initially energizing said bias windings of the switch matrix, means for energizing a selected one of said set windings and simultaneously deenergizing a selected one of said bias windings whereupon the switch core located on the unenergized bias winding and the energized set winding changes its magnetic state to develop a drive pulse on a particular one of said memory array selection windings.

6. In a magnetic memory system comprising an array of saturable magnetic cores capable of assuming bistable states of magnetic remanence arranged in coordinate rows and columns linked by row and column coordinate selection windings individual thereto, means for providing drive pulses to said coordinate windings including a magnetic matrix switch coupled to the selection windings along one of said coordinates, said switch matrix comprising an array of switch cores likewise arranged in coordinate rows and columns linked by individual set and bias windings respectively, each said switch core having an output winding linked to one terminal of an individual one of said selection windings of the memory array with the remaining terminals of the selection windings commonly connected through individual impedances and electrically floating, first means for energizing said bias windings with a current sufficient to bias the switch cores linked thereby toward saturation in one direction, second means for energizing said bias windings with an additional current sufficient to bias the switch cores linked thereby further toward saturation in said one direction, means for energizing a selected one of said set windings with a current sufficient to drive an unbiased switch core toward saturation in the other direction, said first means being operative for all but a selected one of said bias windings and said second means being rendered operative for all but said selected one of said bias windings at the time said set winding is energized.

7. In a switch core driver matrix adapted to provide bidirectional read-write operating currents for a magnetic memory array, a plurality of saturable magnetic cores capable of assuming bistable states of magnetic remanence arranged in coordinate rows and columns with the rows linked by individual set windings and the columns linked by individual bias windings, means for energizing all but a selected one of said bias windings with a current sufficient to drive the cores linked thereby toward saturation in one direction of magnetization, means for energizing a selected one of said set windings with a current sufficient to drive the unbiased core linked thereby toward saturation in the other direction, means for applying a further bias current to all but said one selected bias winding simultaneously with the energization of said selected set winding, and means for subsequently energizing said one selected bias winding.

8. A magnetic core memory system including an array of bistable magnetic cores linked by windings arranged along each of two coordinate directions whereby energization of a winding along one coordinate direction in coincidence with energization of a winding along the other coordinate direction is effective to cause a change in the state of magnetization of the core located at the intersection of said energized windings, selectively operable pulse generator means coupled to one terminal of each of said windings, and circuit means interconnecting the other terminals only of the windings of at least one of said coordinate directions said circuit means being such that a current pulse applied to a selected one of said windings returns to said pulse generator means through the non-selected ones of the windings of that coordinate direction.

References Cited in the file of this patent

UNITED STATES PATENTS

| | | |
|---|---|---|
| 2,734,182 | Rajchman | Feb. 7, 1956 |
| 2,734,184 | Rajchman | Feb. 7, 1956 |
| 2,768,367 | Rajchman | Oct. 23, 1956 |
| 2,785,389 | Warren | Mar. 12, 1957 |
| 2,896,193 | Herrman | July 21, 1959 |

OTHER REFERENCES

An article entitled: "A Myriabit Magnetic-Core Matrix Memory" by J. A. Rajchman, published in "Proceedings of the IRE," October 1953, pp. 1407–1421.